April 23, 1957 D. M. McBEAN 2,789,586
APPARATUS FOR CHARGING VOLATILE PROPELLANT
Filed Dec. 30, 1953 13 Sheets-Sheet 1

INVENTOR
Douglas M. McBean
BY
Pennie, Edmonds, Morton, Barrows and Taylor
HIS ATTORNEYS April 23, 1957 D. M. McBEAN 2,789,586
APPARATUS FOR CHARGING VOLATILE PROPELLANT
Filed Dec. 30, 1953 13 Sheets-Sheet 2

INVENTOR
Douglas M. McBean
BY
Pennie, Edmonds, Morton, Barrows and Taylor
HIS ATTORNEYS April 23, 1957  D. M. McBEAN  2,789,586
APPARATUS FOR CHARGING VOLATILE PROPELLANT
Filed Dec. 30, 1953  13 Sheets-Sheet 3

April 23, 1957 D. M. McBEAN 2,789,586
APPARATUS FOR CHARGING VOLATILE PROPELLANT
Filed Dec. 30, 1953 13 Sheets-Sheet 5

INVENTOR
Douglas M. Mc Bean
BY
Pennie, Edmonds, Morton, Barrows and Taylor
HIS ATTORNEYS April 23, 1957     D. M. McBEAN     2,789,586
APPARATUS FOR CHARGING VOLATILE PROPELLANT
Filed Dec. 30, 1953     13 Sheets-Sheet 6

INVENTOR
Douglas M. Mc Bean
BY
Pennie, Edmonds, Morton, Barrows and Taylor
HIS ATTORNEYS April 23, 1957 D. M. McBEAN 2,789,586
APPARATUS FOR CHARGING VOLATILE PROPELLANT
Filed Dec. 30, 1953 13 Sheets-Sheet 9

INVENTOR
Douglas M. McBean
BY
Pennie, Edmonds, Morton, Barrows & Taylor
HIS ATTORNEYS

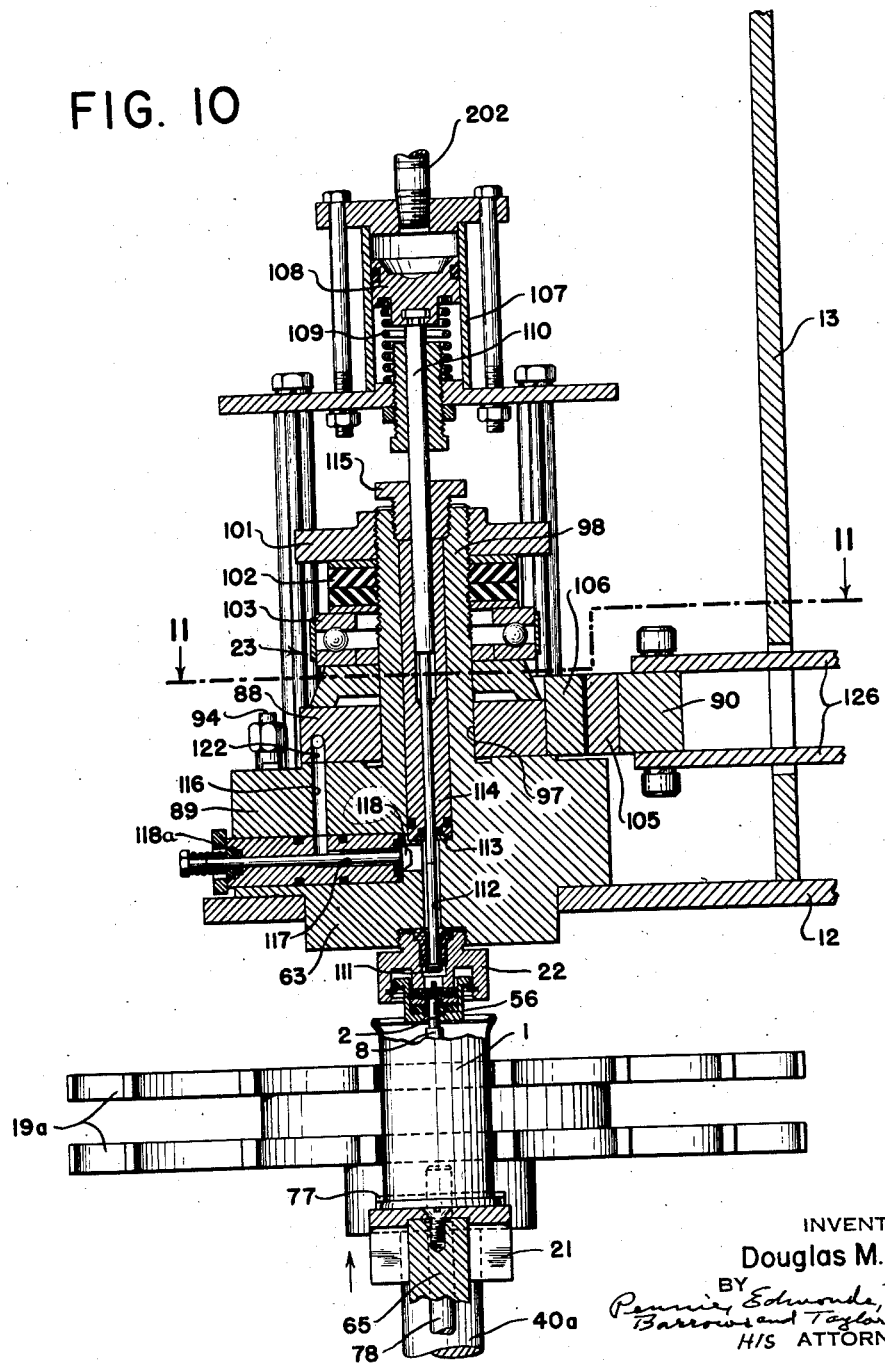

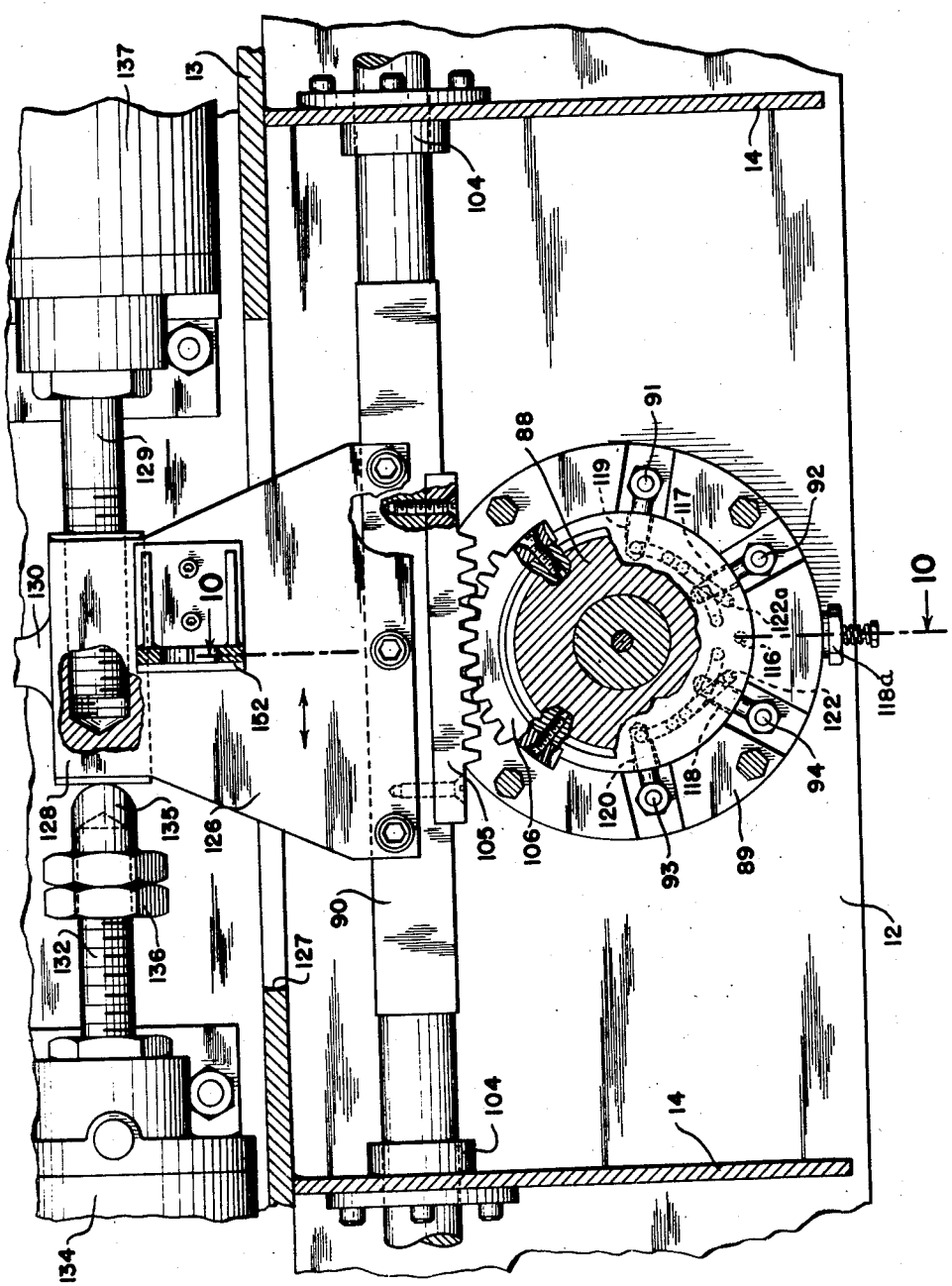

April 23, 1957     D. M. McBEAN     2,789,586
APPARATUS FOR CHARGING VOLATILE PROPELLANT
Filed Dec. 30, 1953     13 Sheets-Sheet 12

INVENTOR
Douglas M. McBean
BY Pennie Edmonds Morton Barrows and Taylor
HIS ATTORNEYS

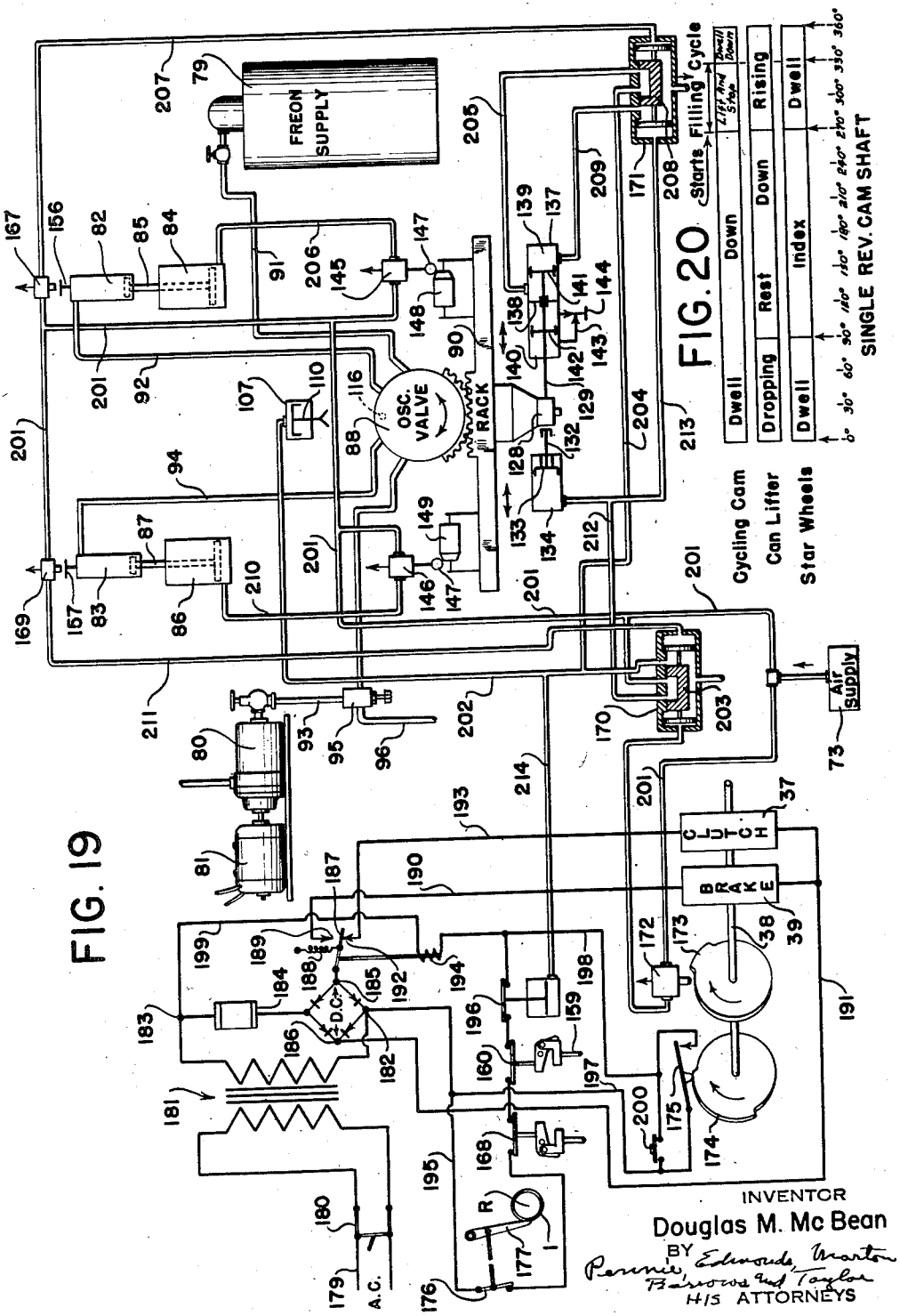

United States Patent Office 2,789,586
Patented Apr. 23, 1957

2,789,586

APPARATUS FOR CHARGING VOLATILE PROPELLANT

Douglas M. McBean, Rochester, N. Y., assignor to Carter Products, Inc., New York, N. Y., a corporation of Maryland Application December 30, 1953, Serial No. 401,193

7 Claims. (Cl. 141—20)

This invention relates to the charging of pressure-tight containers, such as cans, with a composition comprising a liquid product and a volatile propellant in the liquid phase, which propellant has a vapor pressure considerably above atmospheric pressure at room temperature and accordingly acts to propel the product out of the container, upon the opening of an outlet valve on the container. The propellant may also act to modify the physical state of the product as it emerges from the container, as by expanding it into a foam or lather. The present invention, more particularly, is concerned with apparatus for charging the volatile propellant into the containers which have previously been charged with the liquid product, although, if desired, the apparatus can be used for charging both the liquid product and the propellant.

Various methods and apparatus for filling such pressure-tight containers have heretofore been proposed. In some such proposals both the liquid product and the volatile propellant have been introduced into the pressure-tight container through its outlet valve. This necessarily results in slow filling. In my copending application, Ser No. 269,657, filed February 2, 1952, now Patent No. 2,684,806, dated July 27, 1954, a procedure is disclosed wherein the containers are filled with the liquid product before applying the container tops, in which the outlet valves are located. In that application also the air is eliminated from the head space above the liquid product.

The apparatus of the present invention has been devised for the purpose of charging the volatile propellant through the outlet valves of partially filled containers. The containers can be charged with the liquid product, and have their caps applied very rapidly, and the primary object of the present invention is to provide an apparatus for charging the required amount of volatile propellant through the outlet valves with at least the same rapidity, so that these machines can be operated in a can line, with the containers, filled with the liquid product and closed, delivered automatically to the machine of the present invention.

Another object of the present invention is to provide such a charging apparatus which is economical in its use of the propellant.

Another object of the invention is the provision of an automatic charging apparatus wherein the successive charges of the propellant are uniform to a high degree of accuracy.

Still another object of the invention is to provide a charging apparatus of this kind which is entirely automatic in its operation and does not require the presence of an operator.

A further object of the invention is to provide such a charging apparatus which will operate successfully with the propellant and liquid solvent at ordinary room temperatures.

Other objects and advantages of the invention will be apparent as the description proceeds.

The invention will be set forth in connection with the embodiment thereof illustrated in the accompanying drawings, wherein the apparatus introduces successive charges of a liquid volatile propellant and a washing liquid, such as water, into cans which have previously been partially filled with a soap solution and from which the air in the head space of the cans has been removed.

Referring to the accompanying drawings,

Fig. 10 is a vertical section of the charging head drawn to an enlarged scale, the section being taken on line 10—10 of Figs. 6 and 11;

Fig. 11 is a horizontal section taken on broken line 11—11 of Fig. 10 and showing also part of the operating mechanism of the charging valve;

Fig. 12 is a greatly enlarged fragmentary vertical section of the charging head nozzle;

Fig. 19 is a diagram of electrical and piping connections;

Fig. 20 is a timing diagram;

Fig. 21 is a detailed sectional view of one of the air control valves; and

Fig. 22 is an view of the container to be filled.

Figure 1:
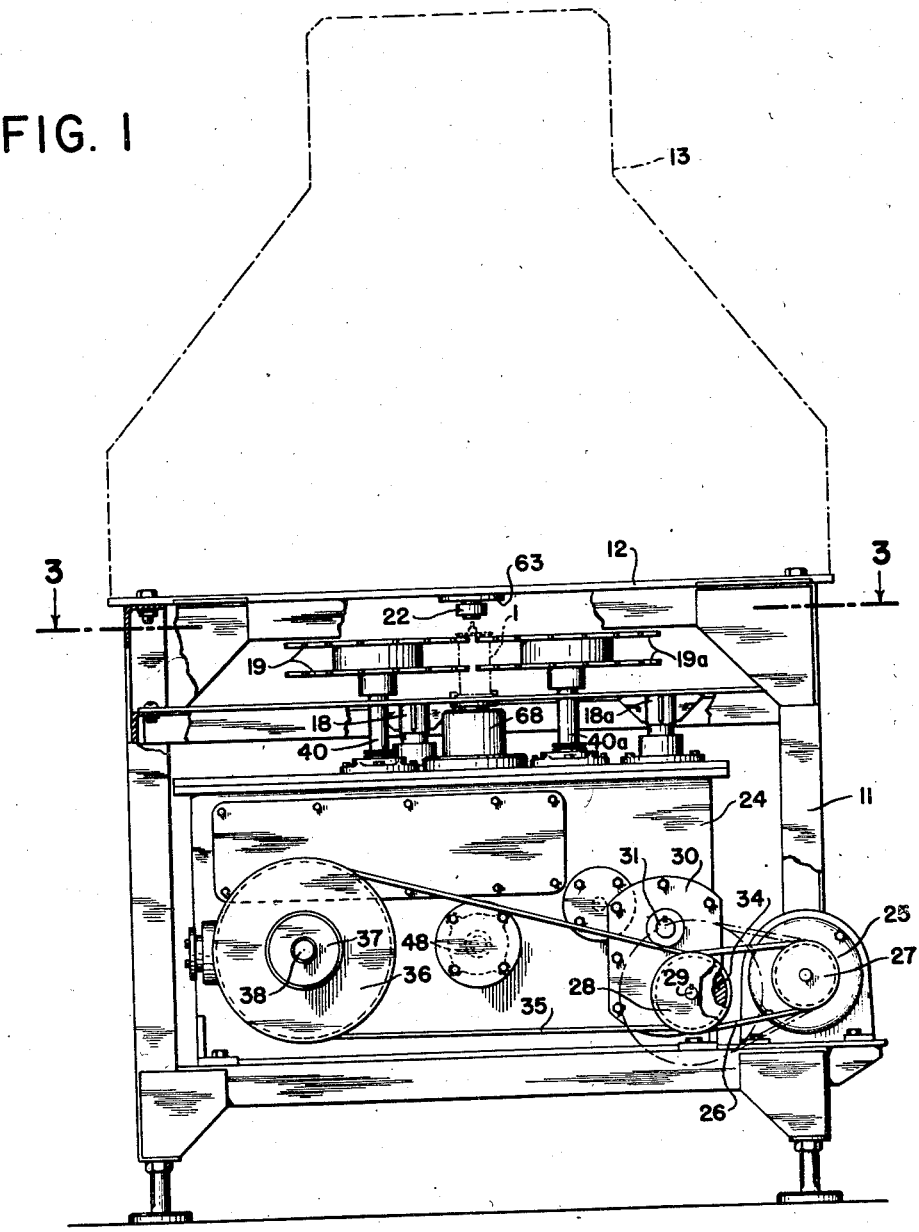
Fig. 1 is a rear elevation of the lower portion of the machine with the upper portion indicated in dot and dash outline.

In general, the machine comprises a charging head and mechanism for automatically and successively positioning the cans beneath it. The apparatus is provided with a can control mechanism, operating through a predetermined cycle, and which operates the can positioning mechanism intermittently and which also brings the can at charging position into sealing engagement with the head and removes the can therefrom after charging. There is a source of propellant liquid under suitable pressure, together with a device for metering this liquid; also a source of washing liquid, such as water or a water solution of soap, under pressure including metering means for the liquid, and a charging valve mechanism for interconnecting the respective liquid sources with the charging head through their respective metering devices. The term "water" is used herein to denote either water or a water solution such as a soap solution.

The machine also includes cycling charging mechanism operating through a predetermined cycle for actuating the valve and metering devices to successively charge the propellant and the water through the valve into the container at the charging position. The water follows the propellant liquid through the charging valve passages to wash the liquid which clings to these passages into the container and thus conserve the propellant. The machine includes mechanism for coordinating the two cycling mechanisms, that is, the can control mechanism and the cycling charging mechanism, so that at the end of the control mechanism cycle the charging mechanism cycle is initiated, and, vice versa, at the end of the charging cycle the can control cycle is restarted, provided that a succeeding can is ready to be advanced to charging position and provided the propellant and water metering cylinders have been refilled.

The embodiment of the invention illustrated is arranged to operate upon cans 1 such as shown in Fig. 22 having a cylindrical body portion and the usual bottom and top beads. The outlet valve is arranged in the top of the can and has a cylindrical body 2, a portion of which projects above the top of the can. The valve 4 is of resilient material and has an operating stem 3. The valve coacts with a valve seat 5 formed at the lower end of the valve body. A coil spring 6 surrounds the stem 3, resting at its lower end at the upper side of the valve seat and engaging at its upper end a pair of projections 7 on the valve stem. The outer end of the valve body is spun inwardly to produce a rounded corner to facilitate connection with the charging head.

The cans 1 come to the machine filled with an aqueous soap solution to the level indicated approximately in Figs. 12 and 22, the head space above this liquid being filled with foam produced by agitation of the soap solution for the purpose of excluding air from the head space, this foam being produced by introducing a gas into the soap solution. The lower end of the valve body is fitted with a syphon tube 8 which extends to the bottom of the container.

A discharge nozzle 9 having a lateral discharge spout, together with an operating button 10, are placed upon the outlet valve after the can leaves the apparatus. It will be understood that depression of valve 4 by means of the button 10, which is threaded upon the upper end of the valve stem allows the pressure of the liquid propellant, to cause the soap solution to be discharged and expanded into a lather.

Figure 2:
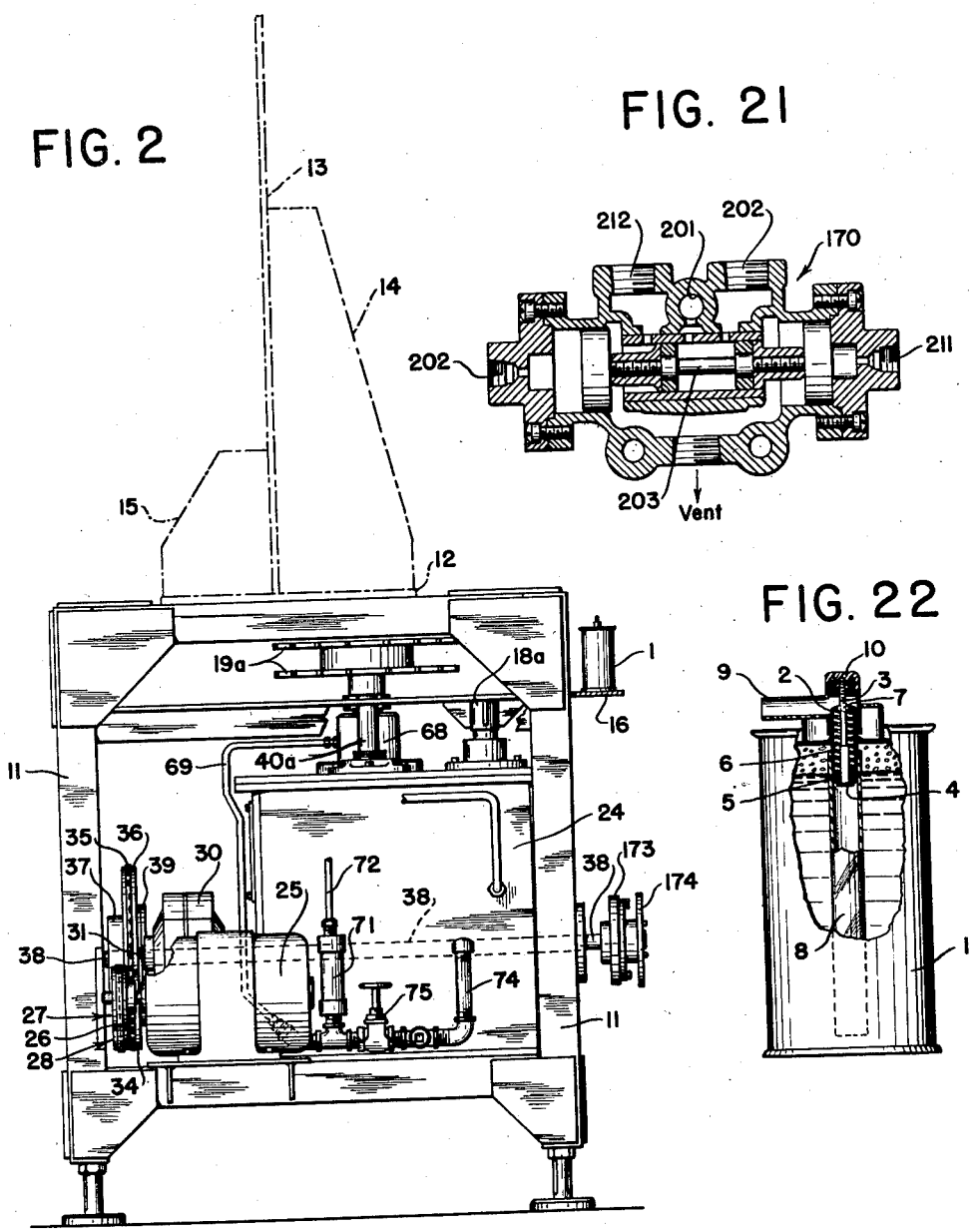
Fig. 2 is a side elevation of the machine looking from the right of Fig. 1 with the upper portion indicated in outline.

The apparatus of the present invention has a substantially rectangular and nearly cubical framework 11 within which is arranged the driving mechanism for the machine together with the can feeding and positioning mechanism. At the top of this framework there is a horizontal steel plate 12 upon which the filling head, the control valve and the operating mechanism therefor are mounted, and extending upwardly from plate 12 there is a vertical frame panel 13 for mounting the liquid metering apparatus and the pneumatic control valves therefor, together with the necessary piping. Panel 13 is braced by two tapering spaced panels at right angles thereto on the front side of the apparatus as shown in Fig. 2. At the rear there are two other frame plates 14 which serve to both brace panel 13 and to support certain other mechanism.

Figure 3:
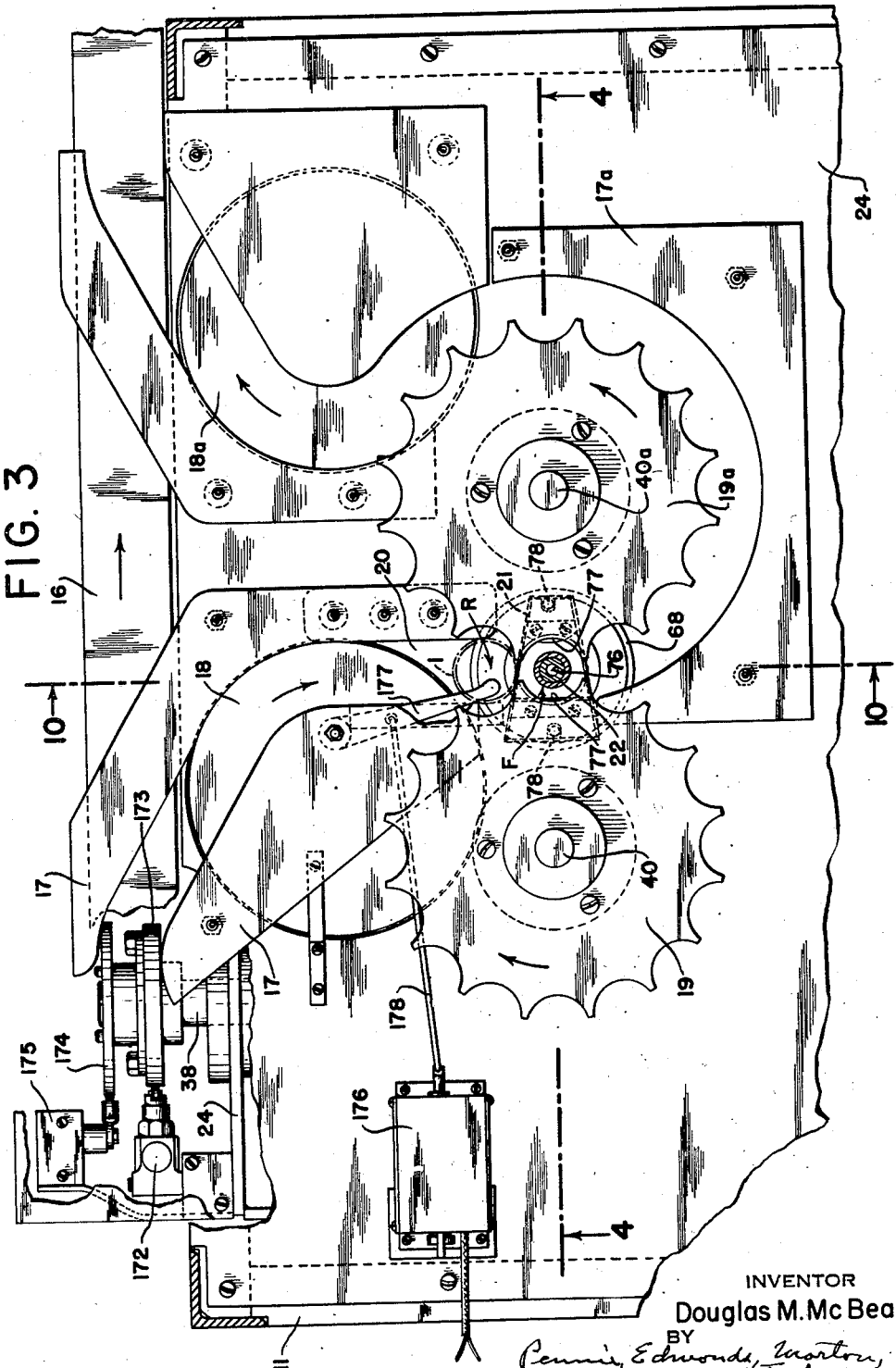
Fig. 3 is a horizontal section taken on line 3—3 of Fig. 1.

The cans are received by the machine on an endless conveyer 16 (Figs. 2 and 3), the discharge nozzles 9 not yet having been applied, so that the valve stem 3 projects freely above the valve body 2. When the cans reach a point approximately abreast of the center of the machine, they are guided laterally from the conveyer 16 by means of a pair of guide plates 17 which direct the cans onto a continuously rotating flat disk 18 that moves them between the guides 17 and between a pair of cooperating twin star wheels 19 and 19a (Fig. 3). As the cans move off disk 18 they are supported upon a small scuff plate 20 and delivered onto a trapezoidal shaped support 21 which is vertically shiftable in a manner to be described and which supports the cans at charging position beneath the charging spout 22 of a charging head mechanism indicated generally by numeral 23 and shown in detail in Figs. 10 and 12.

The cans are advanced by disk 18 to the position R which is just ahead of the charging position F, and are advanced to this position by the rotation of the star wheels which are driven intermittently in a manner to be described. After the charging takes place the star wheels are notched or indexed ahead one can space so that the charged can is carried beyond the charging position and around star wheel 19a, being kept in contact with this wheel by a semi-circular guide plate 17a which eventually directs the cans onto a second continuously rotating disk 18a driven at the same rotative speed as disk 18 and by means of which the cans are returned to the conveyer belt 16. The cans then proceed to the next operation, for example, the applying of the discharge nozzles 9.

The mechanism for driving the various parts of the apparatus, for rotating the can moving disks 18 and 18a for intermittently operating the two star wheels 19 and 19a, and for raising and lowering the can at the charging position F into sealing engagement with the spout 22 are all located in the framework 11 of the machine, and most of them are mounted within a rectangular closed steel casing 24 shown in side view in Fig. 1 and in end view in Fig. 2. The machine is driven by any suitable source of power such as the electric motor 25. An endless belt 26 is trained around pulley 27 on the motor shaft and a pulley 28 on the input shaft 29 of a speed reducer 30 mounted on frame 11 outside of and adjacent to steel casing 24 (Figs. 1 and 2). Speed reducer 30 is mounted to swing on shaft 31 as a pivot so that by shifting motor 25 both of belts 26 and 35 will be tightened simultaneously.

Speed reducer 30 has two output shafts rotating at different speeds.

Figure 4:
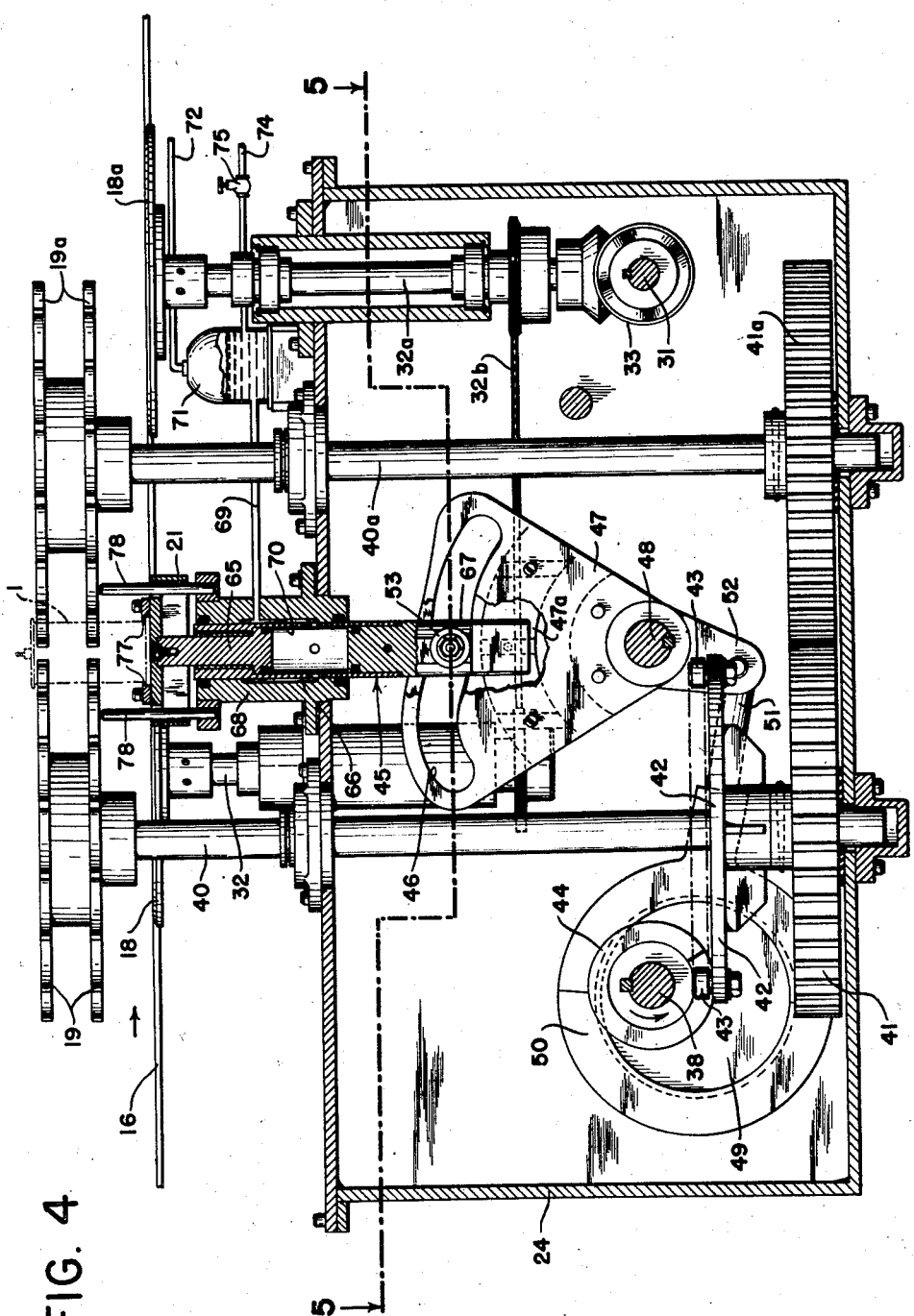
Fig. 4 is a vertical section taken on line 4—4 of Fig. 3, with piping shown diagrammatically.
Figure 5:
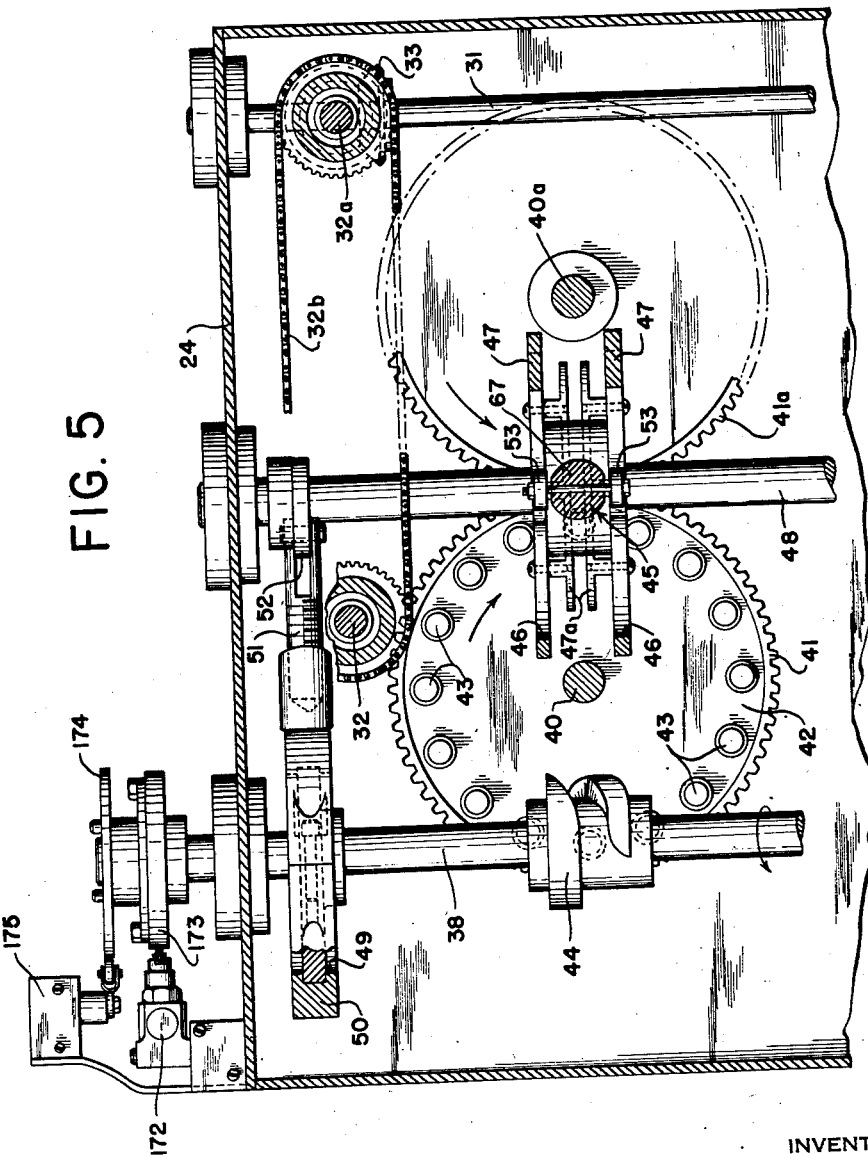
Fig. 5 is a vertical section taken on broken line 5—5 of Fig. 4.

Output shaft 31 extends forward from the speed reducer housing into casing 24 and is supported at its opposite end in a bearing mounted in the front wall of this casing (Fig. 5). Shaft 31 drives, by means of bevel gearing 33, a vertical shaft 32a which carries rotating disk 18a at its upper end. Rotating disk 18 is carried at the top of a vertical shaft 32 which is mounted in bearings similar to those for shaft 32a, and the two shafts are interconnected, so that they rotate at the same speed and in the same direction, by means of an endless chain 32b which is trained around equal sized sprockets as shown in Figs. 4 and 5.

The second output shaft of speed reducer 30 is a sleeve shaft (not shown) which is concentric with shaft 29 and on which is keyed an output pulley 34 (Fig. 2). A belt 35 connects pulley 34 with a larger pulley 36 that drives continuously the driving member of a clutch 37 mounted upon and arranged to drive a cycling control shaft 38 which is part of a cycling mechanism to be referred to later on. Adjacent clutch 37 on shaft 38 there is an electromagnetic brake mechanism 39 (Fig. 2). Shaft 38 extends entirely through the steel casing 24 and projects somewhat from the front surface of framework 11.

The can control mechanism operates through a predetermined cycle to intermittently actuate the star wheels 19 and 19a for the purpose of advancing the cans in a step-by-step movement to and from charging position F and for bringing the body 2 on the can valve into sealing engagement with the charging head spout 22. For this purpose shaft 38 is arranged to drive the star wheels 19 and 19a through a Geneva type gear mechanism. The twin start wheels 19 are mounted in suitably spaced relation, depending upon the height of the cans, on the upper end of a vertical shaft 40, and the twin star wheels 19a are similarly mounted upon a similar shaft 40a. These shafts are interconnected at their lower ends by two similar helical or tightly meshing spur gears 41 and 41a, to avoid backlash between the gears and so keep the star wheels in registry.

Just above gear 41 on shaft 40 the Geneva gear is arranged. This gear is in the form of a disk 42 on the upper surface of which there is a circular series of rollers 43. Engaging these rollers is a Geneva worm 44 which is keyed to shaft 38. The formation of this worm is such that the entire motion imparted to Geneva disk 42 upon a single revolution of driving shaft 38 is accomplished during one-half of the rotation of this shaft, the Geneva disk and the twin star wheels 19 and 19a being held stationary without backlash during the remaining 180° of rotation by the close engagement of rollers 43 with the opposite sides of the worm.

For the purpose of bringing the can valve 2 into sealing engagement with the nozzle 22 of the charging head, the can support 21 is mounted at the upper end of a vertically shiftable member indicated generally by numeral 45 (Fig. 4). This member is moved up and down by means of a closed slotted cam 46 which is cut in the upper margin of a cam segment keyed to a horizontal rock shaft 48.

This shaft is mounted in bearings supported in the opposite walls of steel casing 24 at substantially the same level as shafts 31 and 38. Rock shaft 48 is actuated by an eccentric 49, keyed to cycling control shaft 38, and having an eccentric strap 50 and a connecting rod 51, the latter being pivoted to a short rock arm 52 which projects downwardly from shaft 48.

A pair of cam follower rollers 53 project from opposite sides of member 45 (Fig. 5) and engage twin cam slots 46 in twin sectors 47. Cam slots 46 are so cut as to maintain the member 45 in its lower position, where the can support 21 is at the level of the scuff plate 20 and rotating disk 18, during 180° of rotation of the cycling control shaft 38. During the following 180° member 45 is raised to its upper position and returned to its original position.

In order to make a tight sealing connection with the can valve body 2 the nozzle 22 is constructed as follows (Fig. 12). It has an interior annular projection 54 which surrounds a central fluid passage 55, and surrounding such projection there is a movable sealing member 56. In the bottom of the bore in member 56 which fits loosely over the projection 54 there is a resilient washer 57 preferably of soft synthetic rubber. This washer has a central opening which is slightly smaller in diameter than the valve body 2 so as to fit snugly over this when the can is lifted by the raising of member 45 and can support 21 at the top.

As member 45 rises by the rocking of cam sector 47, the top of the can engages the flat bottom of sealing member 56 causing it to rise with the can at the end of the upward movement of member 45. This causes the soft rubber washer 57 to be squeezed between the bottom of the bore in member 56 and the bottom of annular projection 54, and since the washer 57 fits the bore and is confined on all sides this squeezing action forces the surface of the central opening in the washer more snugly into engagement with the can valve body 2. To enhance such action and also to produce a tighter joint a serrated steel washer 58 may be placed above the soft rubber washer 57, and, if desired, also a nylon washer, or series of washers, shown at 59 may be placed above the serrated washer 58.

In order to retain sealing member 56 in position, it is provided with an annular flange 60 which engages a snap ring 61 that fits into a groove in the wall of the annular recess in nozzle 22, which surrounds the annular projection 54. Nozzle 22 makes threaded connection as indicated at 62 with the body member 63 of filling head 23. In order to provide a tight joint at this point the upper part of the fluid passage 55 in nozzle 22 is counterbored to receive a nylon sealing washer 64 which also serves the purpose of a valve seat to be referred to later on.

In order to maintain a yielding engagement between the top of the can and the sealing member 56, the can support 21 is mounted upon the upper portion of lifting member 45 through a hydraulic cushion, the pressure for which is supplied by means of air pressure. The cam 46 is preferably arranged to lift the can slightly more than is necessary to engage the charging head nozzle 22 so that variations in can height do not result in failure to connect with the nozzle. For this purpose supporting plate 21 is mounted upon the upper end of a plunger 65 which fits at its lower end within a sleeve 66 that forms a chamber below plunger 65 and which is mounted upon the reduced upper end of a solid bar member 67 that forms the lower end portion of member 45. The entire member 45 is arranged to slide in an elongated and flanged guide member 68 which is bolted in an aperture in the top of steel casing 24. At its lower end bar 67 is slabbed to fit between two flat arcuate plates 47a on sectors 47.

Hydraulic pressure is applied to the chamber below plunger 65 by means of a pipe 69 shown in Fig. 2 and diagrammatically in Fig. 4. One end of this pipe is connected to the guide 68, and to the pressure chamber through an annular passage 70 surrounding sleeve 66 and communicating with a series of apertures in this sleeve. The opposite end of pipe 69 is connected to an oil reservoir 71. The air pressure is applied at the top of this reservoir by a pipe 72 that leads from an air supply manifold 73 which is connected with any suitable source of air under a pressure preferably from 60 to 80 p. s. i. g. Oil reservoir 71 may be filled through any suitable supply pipe 74 under the control of a cutoff valve 75.

It is important that when the cans are fed to the charging position F they be located with a fair degree of precision beneath the nozzle 22 in order that, when the can is raised the end of its valve 2 will enter the orifice 76 which may be seen in Fig. 3 and which, as shown in Fig. 12 is flared slightly to facilitate such entrance. The degree of precision required is indicated by the difference in the diameters of this flared portion of the orifice and the diameter of the can valve. Such precision is obtained by the engagement of the body of the can by the double or twin star wheels 19 and 19a on opposite sides, and by the fact that the turning of the star wheels is accomplished by the Geneva worm 44 (Fig. 5), the roller of which fit closely the opposite sides of the worm or cam.

It will be understood that as the opposite cavities of the two star wheels close upon the can at the ready position R, they shift the can into substantial alignment with charging nozzle 22, and when the star wheel stops at this position the can is pressed on all sides by the surfaces of the star wheel cavities. As the can slides from scuff plate 20 onto the surface of the support 21, the bottom bead of the can passes beneath the flanges of a pair of flanged strips 77 which are secured to the upper surface of support 21. This holds the can on the support 21 so that when the support is lowered by cam 46, the can is pulled off of the nozzle 22 of the charging head.

The strips are flared slightly at their entrance ends to facilitate the entrance of the cans between them. In order to maintain these strips in alignment with the direction of the movement of the cans, two guide posts 78 (Fig. 4) are fixed at their lower ends in the flange at the upper end of guide member 68, and extend upwardly through guiding apertures in support 21.

The part of the machine which automatically controls the metering and delivery of the propellant liquid and the washing liquid to the can at charging position F through its valve 2 is illustrated in Figs. 6–19. This mechanism is located at the upper part of the machine and supported on horizontal plate 12 and vertical panel 13. This mechanism includes a supply source for the propellant liquid, such for example as a cylinder 79 of Freon under pressure, which is shown diagrammatically in Fig. 19, and a source of washing liquid under pressure such as the pump 80 which is continuously driven by means of an electric motor 81.

Figure 6:
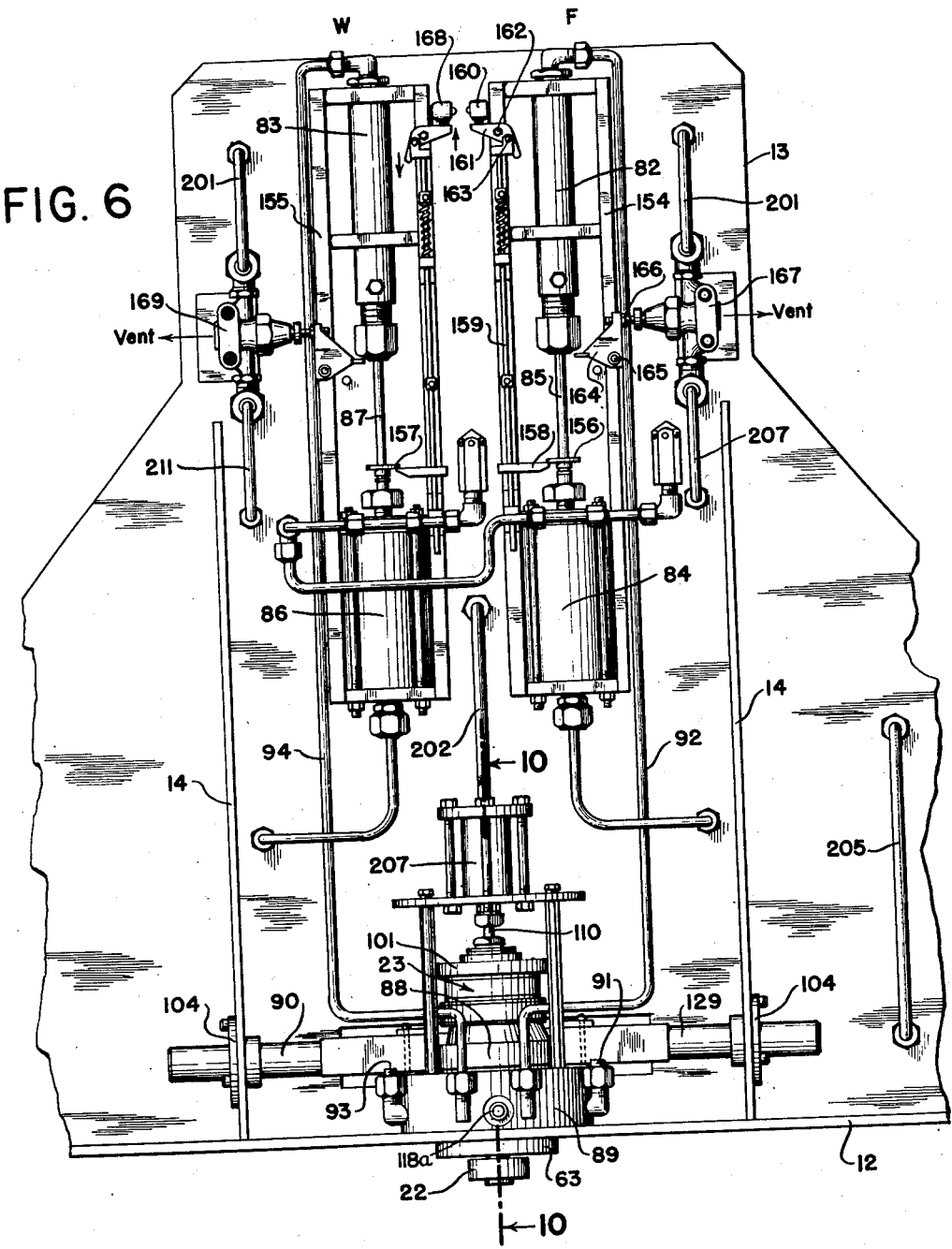
Fig. 6 is a front elevation of the upper part of the machine shown in outline in Fig. 1.
Figure 7:
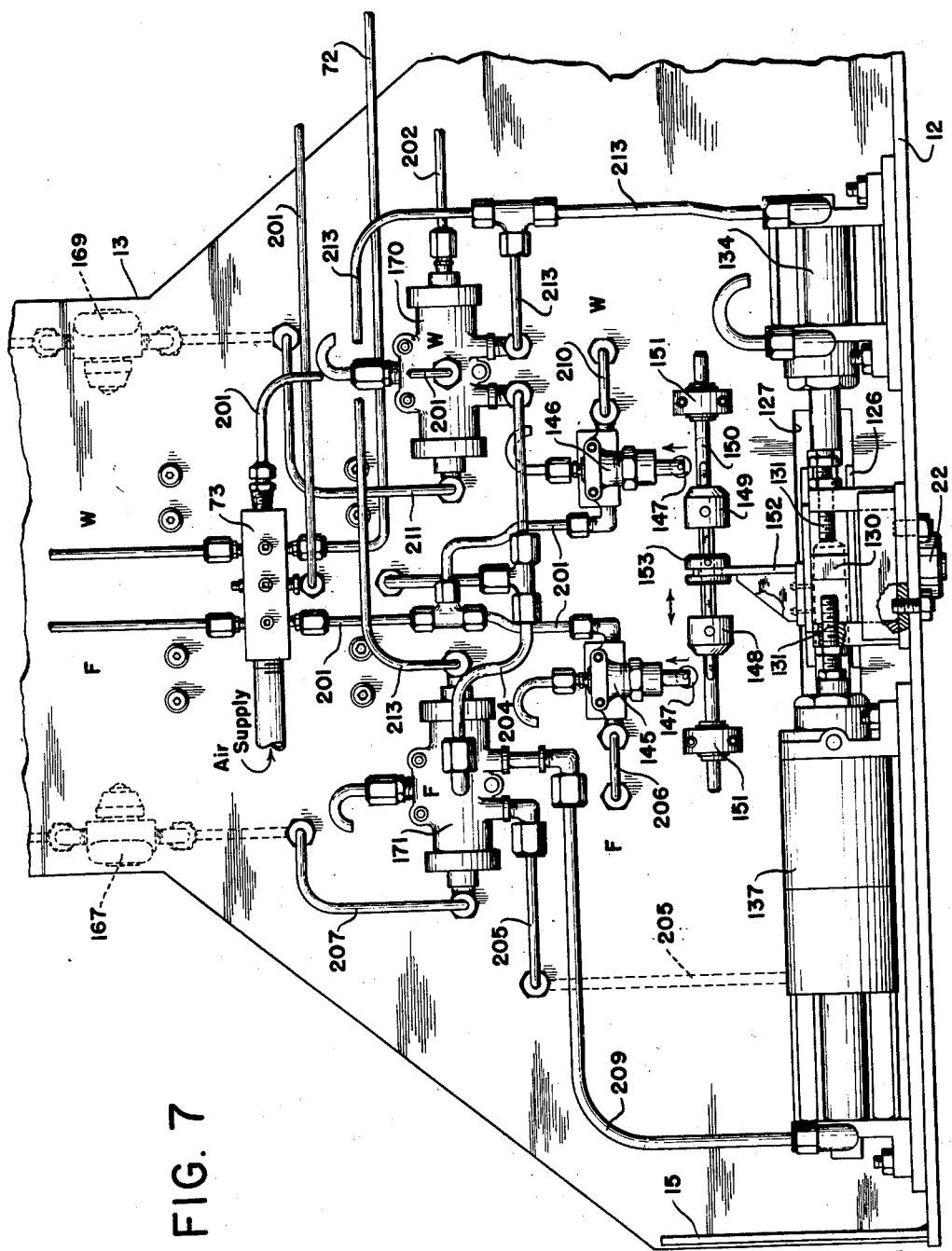
Fig. 7 is a rear elevation of the upper part of the machine shown in outline in Fig. 1.
Figure 8:
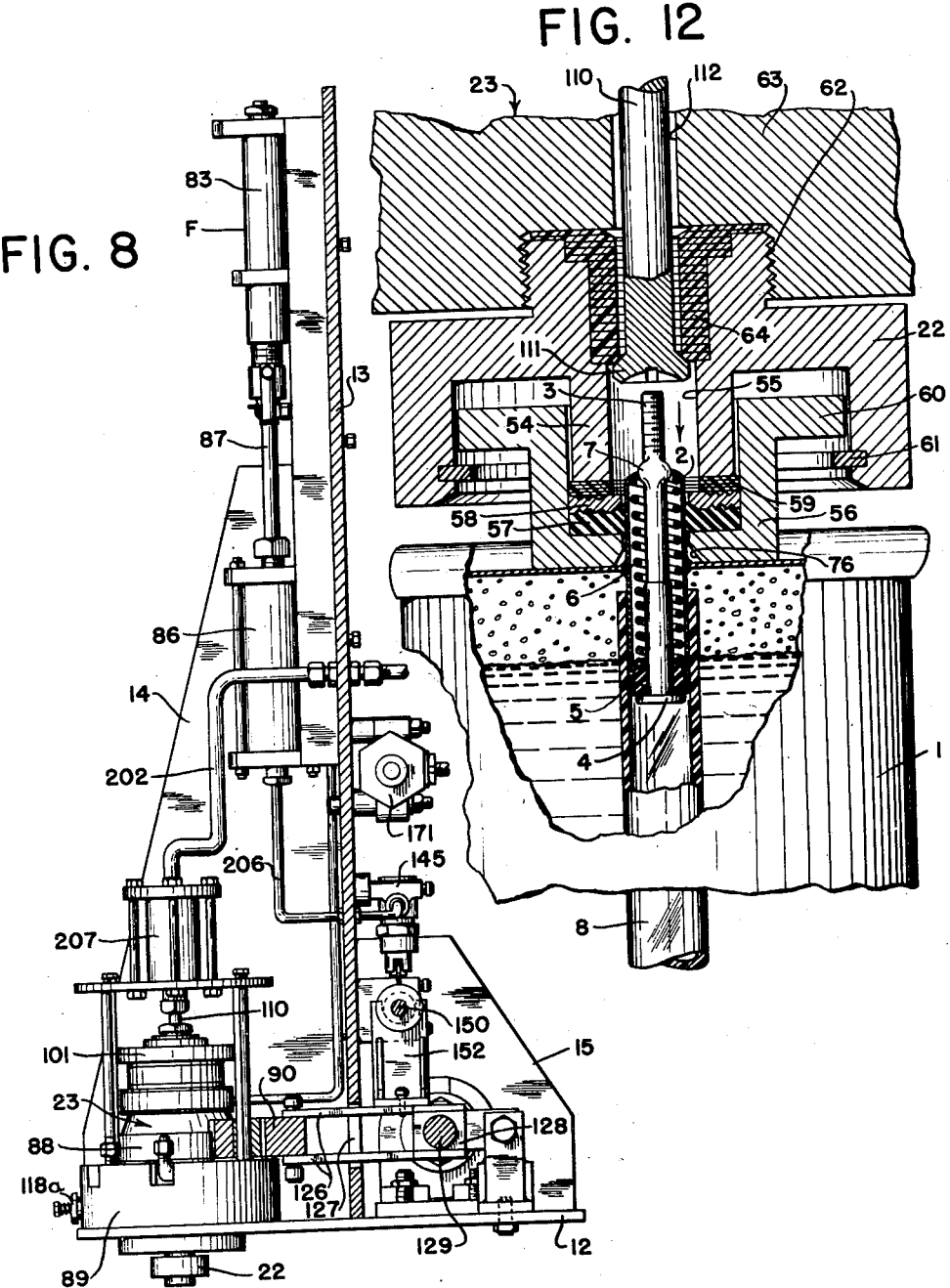
Fig. 8 is a vertical section on broken line 8—8 of Fig. 9.

Such mechanism also includes propellant and water metering cylinders 82 and 83, the piston of cylinder 82 being operated by means of a piston in an air cylinder 84 through a connecting rod 85. The piston of cylinder 83 is similarly operated by means of an air cylinder 86 and piston rod 87 (Figs. 6, 8, and 19). These four parts, namely, the propellant supply cylinder 79, the propellant metering cylinder 82, the water supply pump 80 and water metering cylinder 83 are all interconnected by means of a charging valve 88 which is an oscillating type of valve and cooperates with a stationary valve body 89 (Fig. 10) having passages which lead to the discharge orifice 76 in charging nozzle 22.

Charging valve 88 has three positions, a central or neutral position as shown in Figs. 11 and 19, a propellant supply position when rotated clockwise in Fig. 11 (counterclockwise in Fig. 19), and a water supply position when rotated counterclockwise from the neutral position. In the neutral position discharge to the can is cut off. The propellant supply cylinder 79 is connected to valve body 89 through a pipe 91 and propellant metering cylinder 82 is connected to the valve body through a pipe 92. Also the water supply pump 80 is connected to the valve body through a line 93 and the water metering cylinder 83 through a pipe 94. Preferably a pressure limiting valve 95 with an overflow pipe 96 is placed in the water supply pipe 93, so as to supply the water under a constant pressure.

According to the invention the connection of the pipe 92 to the propellant metering cylinder 82 is at the top of the cylinder, as shown in Figs. 6 and 19. This is to prevent accumulation of any air or non-condensible gases in the metering cylinder which would prevent uniform charging of the cans.

When the charging valve 88 is in the propellant supply position the propellant metering cylinder 82 is connected through passages within the valve to the nozzle discharge orifice 76, and the water supply pipe 93 is connected through passages within the valve to the water metering cylinder 83. Vice versa when valve 88 is in the water supply position the water metering cylinder 83 is connected through the valve to the nozzle discharge orifice 76 and the propellant supply cylinder is connected through the valve to the propellant metering cylinder 82. When the valve 88 is in the central or neutral position the water supply pipe 93 is connected to the water metering and the propellant supply is connected to the propellant metering cylinder.

Figure 9:
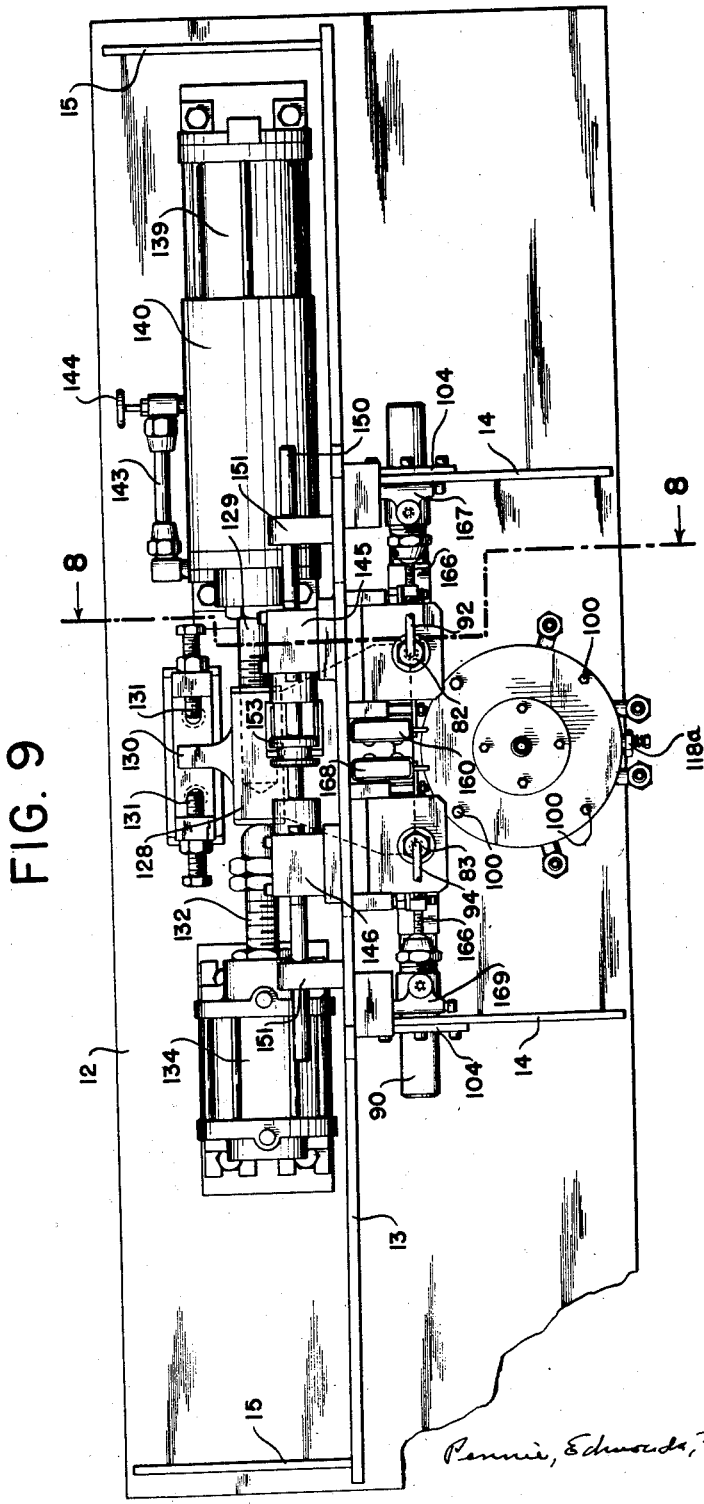
Fig. 9 is a plan view of the machine.
Figure 13:
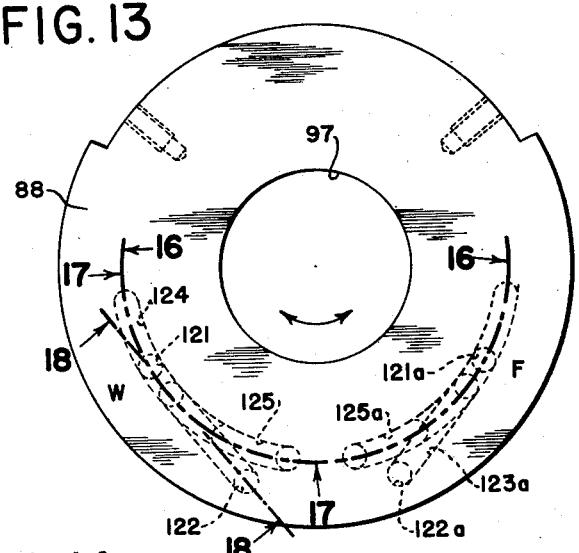
Fig. 13 is a detailed plan view (somewhat less enlarged) of the movable valve member of the charging valve.

The construction of the charging head 23 including the charging valve mechanism and the fluid passages therein will now be referred to (Figs. 10-19). The valve 88, the movable member of the charging valve, is in the form of a thick disk or plate having a central bore 97 that closely fits an elongated upward projection 98 from valve body member 89 which rests on horizontal plate 12. A central projection on its bottom surface is received in an aperture in plate 12 and the body member is attached to the plate by a series of bolts 100 (Fig. 9).

For the purpose of maintaining valve member 88 in fluid tight engagement with the upper surface of valve body 89, and at the same time permitting oscillation of the valve member with the least frictional resistance, a plate 101 is threaded on the upper end of projection 98, and through a series of washers 102 and a ball bearing 103, serves to hold the two valve members in operative relationship. The rack 90 which actuates valve 88 is arranged to slide in bearings 104 (Fig. 11) supported near its opposite ends in the parallel frame plates 14. At the center, rack 90 is provided with a plate 105 having teeth meshing with a gear segment 106 mounted on the rear side of valve member 88. The mechanism for shifting rack 90 will be described later on.

Before liquid can be introduced into can 1, the stem 3 of the can valve 2 must be depressed to open this valve. This is accomplished by means of an air cylinder 107 at the top of the valve mechanism structure. A piston 108 within this cylinder is urged upwardly by a coil spring 109 and is connected to actuate a long vertical rod 110 which projects downwardly through the center of projection 98 of valve body 89, and terminates at its lower end in a slightly enlarged foot 111. This foot is dished in its lower surface (Fig. 12) to engage and depress the end of valve stem 3 when air under pressure is supplied to cylinder 107 as will be presently described. The rod 110 may be separable at the point 214 by a threaded connection to permit assembly and dismounting of the rod. A screw driver slot 215 in the foot 111 facilitates this operation.

It will be understood that the upward projection 98 is suitably bored to receive rod 110 and its packing parts. The lower portion of rod 110 is reduced in diameter and leaves an annular vertical passage 112 in the valve body, which forms the delivery passage for the propellant and the washing liquid to the nozzle 22. The upper surface of foot 111 at the lower end of rod 110 is conical and forms, with a nylon washer 64, a valve which closes the entrance to the delivery passage 112 for the purpose of excluding air from entering the filling passages, which would otherwise tend to enter these passages during the replacement of a charged can by a succeeding uncharged can. The entrance of such air would tend to produce variation in the amounts of propellant liquid and washing liquid charged into the various cans. It would also interfere with fast charging.

To provide a tight seal around the reduced portion of rod 110 above the top of passage 112, this passage is enlarged to form a shoulder 113 on which suitable packing may be placed and which is pressed against the surface of rod 110 by means of an elongated collar 114 and a nut 115 at the top of the upward extension 98.

Referring now to the valve passages, valve body 89 has, located in its central plane at right angles to the vertical frame plate 13, an inlet passage 116 extending from the upper surface of body 89 downwardly to a horizontal passage 117. Annular passage 117 extends radially inwardly and communicates with vertical annular passage 112. The interconnected passages 116, 117 and 112 are continuous without pockets and of a minimum section to prevent accumulation of propellant and water which might collect and so vary the amount supplied to different cans. A spring loaded back pressure valve 118a is provided within a small chamber at the intersection of passages 117a and 112. The purpose of this valve is to prevent discharge of water or propellant when a can is removed from the nozzle of the charging head, so that these passages will at all times be maintained completely filled, either with the propellant liquid or the washing liquid. In this way the successive charges of liquid, whether of propellant or of water, will be uniform in amount.

Referring to Fig. 11, on equal distances from and at opposite sides of the vertical inlet passage 116 there are located connections for the pipes from the two metering cylinders. Pipe 92 from the propellant metering cylinder 82 communicates through such a connection with a passage 117 in valve body 89. Pipe 94 from the water metering cylinder 86 similarly connects with a passage 118. Also equidistant from inlet 116 are connections for the pipes from the liquid supply sources. Thus pipe 91 from the propellant supply source 79 is connected to a passage 119, and pipe 93 from the water supply source is connected to a passage 120.

Figure 15:
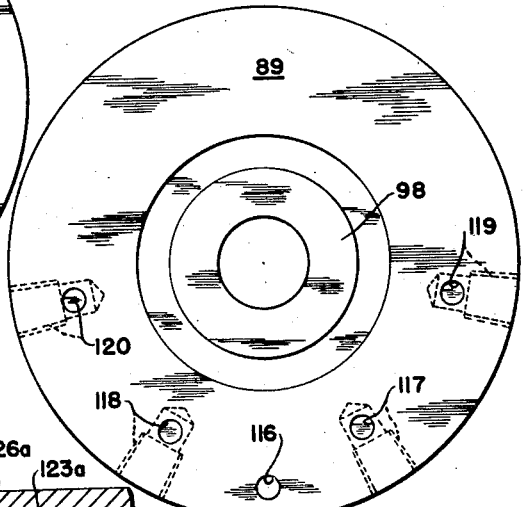
Fig. 15 is a plan view of the operating face of the charging valve body.
Figure 16:
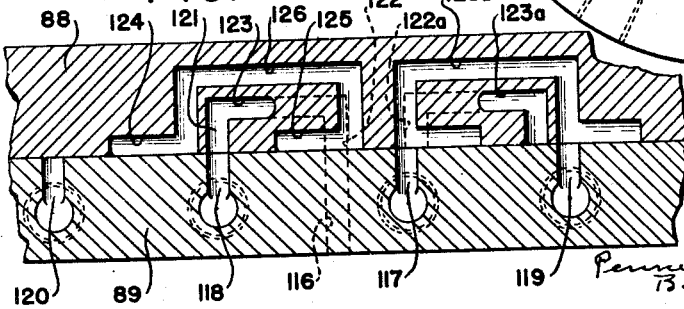
Fig. 16 is a fragmentary sectional assembly view taken on the semi-circular line 16—16 of Fig. 13 and showing the movable and stationary valve parts in one operative position.

These passages are also shown in Fig. 15 which is a plan view of the operating face of valve body 89. At their inner ends each of these radial passages extends upwardly and terminates in a corresponding valve opening in the operating face of the valve body. These four valve openings are arranged at a common radial distance from the center of the valve body.

Valve 88 is provided with two sets of connected ports on one side of the valve for making the propellant interconnections with the ports 117 and 119 and inlet port 116, and with two similar sets of ports on the opposite side of the valve for making the appropriate connections between the water control ports 118 and 120 and inlet port 116. Thus referring to Figs. 13 and 18 the two ports 121 and 122 are interconnected by a passage 123 and are spaced apart the proper arcuate distance to interconnect port 118 from the water metering cylinder to inlet port 116 when valve 88 is oscillated counterclockwise in Fig. 13 from its neutral position to bring port 122 in registry with inlet port 116 of the valve body.

Also with valve 88 in this position ports 124a and 125a (Fig. 17), which are interconnected by passage 126a (independent of passage 123a), are in registry respectively with Freon metering port 117 and Freon supply port 119. Because of the length of the slotted ports 124a and 125a, this connection is also made when the valve 88 is in the neutral position. Hence when valve 88 is in this position water can be charged from water metering cylinder 83 through the pipe connections previously described, through the charging valve, into inlet port 116 and thence through passages 117a and 112 to nozzle 22 and into the can 1 at the charging position.

Figure 14:
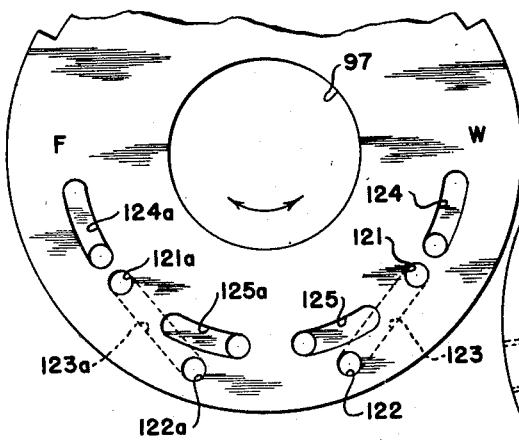
Fig. 14 is a bottom view of the same member.
Figure 17:
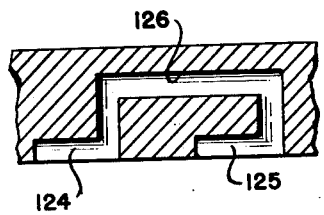
Fig. 17 is a similar view showing one set of valve passages in the movable valve member, the section being taken on line 17—17 of Fig 13.
Figure 18:
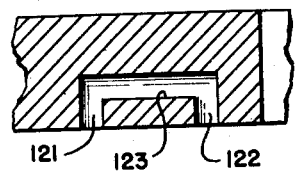
Fig. 18 is a similar view taken on line 18—18 of Fig. 13.

It will be understood that the interconnected passages shown in Figs. 18 and 17 respectively are repeated on the opposite, or propellant liquid, side of valve 88, these passages being indicated by the same numerals without the subscript "a." Consequently, when valve 88 is oscillated to its position on the opposite side of neutral, similar connections are provided for the charge of propellant liquid from metering cylinder 82 through the valve mechanism and the charging head passages into can 1. The valve ports 121, 122 and 121a and 122a are circular ports of the same diameter as the cooperating ports in valve body 89. Valve ports 124 and 125 and 124a and 125a are arcuately extended as shown in Figs. 17 and 14 in order to continue the communication between the respective liquid supply sources and the respective metering cylinders, when the valve 88 is in the neutral position and during a portion of the shifting movement of the valve 88, to insure complete filling of the metering cylinders.

The propellant is delivered from the metering cylinder 82 at a high pressure, and to prevent this pressure becoming so high as to separate the valve plates, the ports 121a and 122a are of small cross-section. The slotted ports 124a and 125a carry propellant at relatively lower pressure and hence can be slotted, i. e., arcuately extended.

The operating mechanism for shifting the position of valve 88 by means of rack 90 is illustrated in Figs. 6, 7, 9 and 11 and diagrammatically in Fig. 19. In Fig. 19 the valve 88 and its operating air cylinders are shown as if viewed from below, so that the ports are reversed from the showing in Fig. 11. Referring particularly to Figs. 8 and 11, twin steel plates 126 are bolted to the respective upper and lower surfaces of rack 90 and project rearwardly through an elongated slot 127 in frame plate 13 (Figs. 6 and 11). At their rear ends they are welded to the upper and lower faces of a block 128 which is threaded upon the left end of a piston rod 129. Block 128 has a horizontal projection 130 (Fig. 9) which moves between a pair of limiting and adjustable stop screws that are fixed in any suitable manner to plate 12.

Piston rod 129 operates rack 90 to oscillate valve 88 from the neutral or central position, first in the clockwise direction as shown in Fig. 11 (counterclockwise in Fig. 19), in order to place the valve in position to charge the propellant liquid through the charging head into the can at charging position F. Thereupon piston rod 129 is actuated in the reverse direction and turns valve 88 in the opposite direction past the neutral position and to the second operating position where the water is sent through the passages of the charging head to wash the clinging propellant into the can.

At the mid-point of this second movement of piston rod 129, the block 128 engages the end of a second piston rod 132 and moves it to the left. At the end of the charging cycle valve 88 is returned to the starting or neutral position by piston rod 132, the end of which merely abuts against the block 128, it being understood that the stroke of the piston 133 (Fig. 19) which is mounted on piston rod 132 within an air cylinder 134, corresponds to the movement of block 128 required to return the valve to neutral position. In order to obtain precise adjustment of the return of valve 88 to neutral position, an adjustable end 135 is screwed onto piston rod 132 and held in adjusted position by a lock nut 136.

Air cylinder 137 for piston rod 129 is about double the length of cylinder 134 and, at its center has a division wall (Fig. 19) which divides the cylinder into two sections, namely, an operating cylinder 139 at the right end, and a hydraulic snubbing cylinder 140 at the left. An operating piston 141 is mounted on the end of piston rod 129 within operating cylinder 139, and is at the center of cylinder 137 when valve 88 is at neutral position. A snubbing piston 142 is mounted on rod 129 within cylinder 140.

The sections of snubbing cylinder 140 on opposite sides of piston 142 are interconnected by means of piping 143 in which a valve 144 is located to control and adjust the timing of the snubbing movement impressed upon piston rod 129. The operation of these two cylinders will be referred to later on in connection with a description of the general operation of the apparatus.

The movement of rack 90 by the air cylinders 139 and 134 is utilized to actuate two cam operated pilot valves for controlling the admission of air pressure to the cylinders 84 and 86 which operate the propellant and water metering cylinders respectively. The pilot valve which controls the propellant driving air cylinder 84 is shown at 145 in Figs. 7 and 19, and a similar valve 146 controls the admission and discharge of air to the water driving air cylinder 86. These valves are of the plunger type each with a roller 147 at the bottom which is engaged by a horizontally shiftable cam. Cam 148 actuates valve 145 and cam 149 valve 146.

These two cams are mounted in fixed but adjustable position on a horizontally slidable rod 150 arranged to slide in fixed brackets 151 mounted on the rear side of frame panel 13. These brackets support rod 150 above the air cylinders 134 and 137, and the rod is shifted back and forth by a forked member 152 (Figs. 7 and 11) attached by screws or otherwise to the upper twin plate 126 interconnecting piston rod 129 and rack 90. Forked member 152 engages a grooved collar 153 which is fixed upon the central portion of rod 150.

The two metering cylinders 82 and 83, together with their operating air cylinders 84 and 86 are mounted on the front of frame panel 13, being attached thereto by rectangular frameworks 154 and 155 (Fig. 6). On each of the respective piston rods 85 and 87 there are mounted actuators 156 and 157 respectively. At the end of the downward stroke of the piston in the propellant metering pump 82 actuator 156 engages a horizontal striker 158 which is secured to a vertically shiftable rod 159 mounted to slide in suitable supports on rectangular framework 154. This rod actuates a normally open micro-switch 160 and closes the switch on downward movement of the rod through a lever 161 which is pivoted to the framework at 162 and to which the upper end of the rod is pivoted at 163. This switch is thus not closed unless metering cylinder 82 has been filled with propellant liquid.

At the upper end of the stroke of the metering piston in cylinder 82 the actuator 156 engages a bell crank lever 164, which is pivotally mounted at 165, and swings this lever in the clockwise direction. Such movement causes the upper arm of bell crank 164 to actuate the operating plunger 166 of a three-way air pilot valve 167, the function of which will appear later in the description of the operation.

A micro-switch 168 is also mounted on rectangular framework 155 for the water metering cylinder 83 and is similarly actuated and closed at the bottom of the stroke of the water metering piston by the actuator 157. Also, a second pilot valve 169 similar to pilot valve 167, and similarly mounted, is actuated by actuator 157 at the top of its stroke, that is, after the charging of the water has been completed.

The pneumatic control mechanism includes two master control valves 170 and 171 (Fig. 7) which are mounted on the rear of frame panel 13, the operation of which will be referred to presently. A master pilot valve 172 which is a three-way normally closed valve similar to valves 167 and 169, is mounted on the outside of steel casing 24 adjacent the projecting end of cycling control shaft 38 which projects through the front wall of this casing 24 as shown in Figs. 3 and 5. The roller of this valve is engaged and operated by a cam 173 fixed adjacent the end of this shaft. The opening of valve 172 causes the operation of the pneumatic cycling mechanism for the charging valve and metering cylinders as will be later described.

Adjacent cam 173 on the end of shaft 38 there is a second cam 174 which actuates a normally closed microswitch 175, also to be referred to presently. Another switch in the operating circuit of the machine is shown at 176 in Fig. 3. It is held in normally open position by means of a spring and is closed by the can at the ready position R, adjacent the charging position F, through a lever 177 and a link 178.

Automatic control of the apparatus to bring about the feeding and positioning of the cans at charging position F and removing them therefrom and for causing the operation of the charging valve 88 and metering cylinders 82 and 83 is accomplished by mechanical, electrical and pneumatic mechanism, as illustrated diagrammatically in Fig. 19. The can control mechanism is operated through its predetermined cycle by the rotation of cycling control shaft 38 (Figs. 1 and 5). One revolution of this shaft operates the can control mechanism through a complete cycle and also brings about the operation of the pneumatic charging mechanism.

The driving of shaft 38 from the continuously rotating pulley 36 (Figs. 1 and 2) is controlled by means of the clutch 37 and brake 39 both of which are electrically operated, and together constitute a one-revolution clutch.

Current for operating the clutch and brake and other parts of the machine is furnished from a supply line 179 through a cut-off switch 180 to a transformer 181. The secondary terminals 182 of this transformer are a source of A. C. for the control circuits, and a rectifier 184 having output terminals 185 and 186 constitutes a source of D. C. for the clutch and brake circuits. These circuits are controlled by a three-way solenoid operated switch 187 which is normally closed by means of a spring 188 against an upper contact 189. A conductor 190 leads from this contact to one terminal of the electric brake 39. The opposite terminal is connected to return conductor 191 which completes the circuit to the opposite terminal 186 of the D. C. source.

The lower contact 192 of solenoid switch 187 is connected through a conductor 193 to one terminal of the electro-magnetic clutch mechanism 137, the opposite terminal being connected to return conductor 191. Thus, when switch 187 is in raised position the brake circuit is energized and when the switch is pulled downwardly to its lower position by solenoid coil 194, the brake is de-energized and the clutch 37 is energized, to stop rotation of shaft 38.

The control circuit for the apparatus consists of a circuit for energizing switch solenoid 194 and this circuit starts at terminal 182 of the transformer and leads through a conductor 195 to switch 176 which is actuated by the can at ready position R, and then through switches 168 and 160 in series, which are closed only when the two metering cylinders are completely filled, and thence to solenoid 194 through a normally closed pressure operated switch 196 which is operated from the pneumatic cycling system to be described presently. The opposite terminal of the solenoid is connected through a conductor 199 to the opposite terminal 183 of the transformer.

A circuit in parallel with these four switches leads from conductor 195 through a conductor 197 through switch 175, which is operated by cam 174, and thence through a conductor 198 to solenoid 194. A push button type switch 200 may also be used to close the solenoid switch for jogging the apparatus to change the position of its various parts for adjusting purposes.

The operation of the apparatus will now be described with reference to Fig. 19.

Assuming that the cam shaft 38 is in the position shown in Fig. 19 which is the 0° position of the timing diagram (Fig. 20), and assuming also that a can has just arrived at the ready position R, the cycle of operation has just started by the closure of switch 176, it being assumed that the metering cylinders are full and that the pressure operated switch 196 is in its normally closed position. The circuit is thus completed through these four switches to the coil 194 which has just drawn down the switch 187 closing the circuit to energize clutch 37. Shaft 38 is therefore just commencing to rotate in the clockwise direction as shown by the arrows.

With shaft 38 at the 0° position the can lifter cam 46 is at the end of its stroke toward the right (Fig. 4) so that the can is in raised position in sealing engagement with the nozzle 22 of the charging head as shown in Fig. 10. During the first part of the rotation of shaft 38 cam 46 lowers the can 1 from the position shown in Fig. 10 to that shown in Fig. 4, where the bottom of the can is at the same level as the scuff plate 20.

The continual rotation of shaft 38 causes Geneva worm 44 to index the pairs of twin star wheels 19 and 19a to remove the charged can from charging position F, and to move up the succeeding can from the ready position R. Cam 46 raises the new can at the charging position to engage nozzle 22. At the 270° position of shaft 38 cam 173 momentarily opens pilot valve 172. The shaft 38 completes its revolution and is stopped by de-energization of the clutch 37 and energization of the brake 39 when the cam 174 opens the switch 175. The opening of the pilot valve 172 starts the cycle of operation of the can charging mechanism which charges a can while the shaft 38 is stationary. The details of this can charging operation will now be described.

The opening of valve 172 causes air under pressure to flow from the air supply manifold 73 through line 201 and pipe 202 to the left end of master control valve 170. This starts the operation of a pneumatic cycling mechanism by putting air pressure on the left piston of this valve which causes the valve member 203 to shift to the right. This connects the air supply line 201 with a pipe 202 thus supplying air to the top of the can valve opening cylinder 107 and causing rod 110 to be depressed and open the valve of the can at charging position. Air pressure is also applied simultaneously through a pipe 214 to the pressure operated valve 196, causing this valve to open. This does not, however, interrupt the rotation of shaft 38 because a parallel circuit around switch 196 has been closed through cam operated switch 175 by the passing of the high part of cam 174 from beneath this switch. This also, through a branch pipe 204 causes air under pressure to be supplied through the second master control valve 171 to pipe 205 and thence to the left end of cylinder 139 causing piston 141 to move to the right and shift rack 90 so as to rotate charging valve 88 from neutral position into the position to connect the Freon metering cylinder 82 with the inlet passage 116 of the charging valve body, and thence through the subsequent passages of the valve to the nozzle 22.

The speed of movement of charging valve 88 is governed by the setting of the hydraulic snubbing valve 144. This permits prompt but not violent movement of the charging valve.

The construction of master control valve 170 is more accurately shown in Fig. 21. Valve 171 is similarly constructed.

As rack 90 moves to the right in Fig. 19 cam 148 opens pilot valve 145. This connects air pressure from line 201 through valve 145 and pipe 206 to operate air cylinder 84 and move the piston of metering cylinder 82 to discharge the propellant into the can at charging position. As soon as the actuator 156 opens pilot valve 167 air pressure is also admitted from supply line 201 to pipe 207 and the right end of master control valve 171. This causes the right hand piston on this valve to move valve member 208 from the right to the left position as shown in Fig. 19. This causes air under pressure from pipe 204 to pass into pipe 209 and enter air cylinder 139 on the right hand side of piston 141, at the same time venting the opposite end of this cylinder through pipe 205 to atmosphere through the vent at the bottom of valve 171. As piston 141 moves to the left it pushes piston 133 to the left and at the same time rotates charging valve 88 in the opposite or clockwise direction (Fig. 19) so that pipe 94 from the top of the water metering cylinder 83 is connected through valve 88 to the can at the charging position.

As rack 90 moves to the left it causes cam 149 to open pilot valve 146, and this connects air line 201 through valve 146 and pipe 210 to air cylinder 86, so as to cause the metering cylinder 83 to inject the water therein into the can at charging position F. At the same time cam 148 releases pilot valve 145 causing pipe 206 from air cylinder 84 to be vented to atmosphere through the vent port in valve 145. This allows pressure within the propellant supply tank 79 to replenish the metering cylinder 82 through pipe 91 and charging valve 88.

Metering cylinder 83 proceeds to inject water into the can at the charging position through charging valve 88, and at the end of the stroke of the piston in this cylinder, actuator 157 opens pilot valve 169. This causes air to be admitted from line 201 through this valve and through pipe 211 to the right hand end of master control valve 170. This causes the piston at the right end of this valve to shift its valve member 203 back to its original position as shown in Fig. 19.

In that position air line 201 is connected to pipe 212 and to cylinder 134 causing piston rod 132 to move rack 90 and charging valve 88 back to the neutral position. At the same time air from pipe 212 passes through a branch pipe 213 to the left end of control valve 171 and causes the piston at this end to shift valve member 208 back to its original position as shown in Fig. 19. In this position of valve 208 the right end of cylinder 139 is vented through pipe 209 to atmosphere through the vent at the bottom of valve 171, which permits the movement of the parts just referred to by piston rod 132.

It will be understood that hydraulic snubbing piston 142 serves as a snubbing device for piston 133 and piston rod 132 in moving the charging valve and its associated parts back to its neutral position.

Can valve opening air cylinder 107 is vented to atmosphere through line 202 and the vent in the bottom of control valve 170. Upon release of this air pressure spring 109 (Fig. 10) raises piston rod 110 and allows the valve in the can at charging position F to reclose.

Upon the release of pressure from pipe 202 through the return of valve member 203 in control valve 170 to its original position and venting pipe 202 to atmosphere, the pressure in line 214 and switch 196 was also reduced, thereby causing this switch to return to closed position. This will not start rotation of shaft 38 if a can is not in the ready position R or if either of the two metering cylinders is incompletely filled. Assuming, however, that these three conditions are satisfactory at the instant that the reduction in pressure in line 214 recloses pressure operated switch 196, the closure of this switch will re-energize solenoid 194. Thus rotation of cam shaft 38 will again be initiated and a succeeding cycle of operation of the apparatus will immediately commence, advancing another can to charging position F, simultaneously removing the can just charged, and charging the new can.

I claim:

1. In a machine for charging a volatile propellant into a pressure-tight container partially filled with a liquid product and having an opening controlled by a valve, a charging head to receive said valve opening in sealing connection, a source of propellant liquid under pressure including fluid pressure operated metering means therefor, a source of washing liquid under pressure including fluid pressure operated metering means therefor, charging valve means for interconnecting said liquid sources to said charging head through said respective metering means, and pneumatic charging means operating through a predetermined cycle for actuating said propellant and washing liquid metering means and said charging valve to successively charge said liquids through said valve into the container connected to said charging head, said charging means comprising a double acting piston connected to rotate said valve to either of two charging positions, a single acting cylinder having a piston connected to rotate the valve back to neutral position from one of said charging positions, two four-way fluid pressure actuated control valves, one of said valves being connected to control the double acting piston, and the other of said valves being connected to control the single acting piston, valve means actuated by the charging valve for controlling the supply of fluid pressure to the respective fluid pressure operated metering means, a pilot valve for controlling the supply of fluid pressure to the second mentioned control valve to initiate the operating cycle by shifting this valve to supply fluid pressure simultaneously to the inlet port of said first mentioned control valve and to a container valve opening cylinder, and valve means actuated at the end of the operation of each of said respective metering means, one of said valve means causing the shifting of the second control valve to reverse the operation of said charging valve, and the second of said valve means being connected to supply fluid pressure to the first control valve to return it to its original position for a restart of the cycle.

2. In a machine for charging a volatile propellant into a pressure-tight container partially filled with a liquid product and having an opening controlled by a valve, a charging head, container handling mechanism including a control shaft the rotation of which through a single revolution feeds a container to charging position beneath said charging head and brings the valve of said container into sealing engagement with said charging head and removes the previously charged container, a solenoid actuated one-revolution clutch for controlling the rotation of said control shaft, a source of propellant liquid under pressure including metering means therefor, a source of washing liquid under pressure including metering means therefor, a charging valve for connecting said liquid sources to said charging head through said respective metering means, a pneumatic charging means operating through a predetermined cycle for actuating said propellant and washing liquid metering means and said charging valve to successively charge said liquids through said valve into the container, said pneumatic charging means having a normally closed pilot valve for initiating the operation of said pneumatic charging means, and a pressure operated switch having a fluid pressure connection to said pneumatic charging means to close said switch at the end of the cycle of said pneumatic charging means, said switch being connected in the operating circuit of said solenoid to close said circuit and initiate the rotation of said control shaft.

3. In a machine for charging a volatile propellant into a pressure-tight container partially filled with a liquid product, a source of propellant liquid under pressure including metering means therefor, a source of washing liquid under pressure including metering means therefor, valve means for interconnecting said liquid sources to said charging head through said metering means, said valve means including an oscillating valve member having a neutral position and a charging position on each side of the neutral position for respectively charging the propellant and the washing liquid, and mechanism for operating said valve member comprisnig a rack member operatively connected to rotate said valve member, an operating fluid pressure cylinder having a piston whose piston rod is connected to move said rack in either direction, said piston being disposed at the center of said cylinder when the valve member is at neutral, means for admitting fluid pressure to either side of said piston, and a hydraulic snubbing device associated with said piston rod to permit prompt but nonviolent movement of said valve member by the fluid pressure.

4. A machine for charging a volatile propellant into a pressure-tight container as set forth in claim 3 in which the snubbing device is a hydraulic cylinder disposed coaxially with the operating cylinder and having a piston on the same piston rod with the piston thereof, and an adjustable fluid connection between the cylinder spaces on the opposite sides of said snubbing piston to control the snubbing effect.

5. In a machine for charging a volatile propellant into a pressure-tight container partially filled with a liquid product, a source of propellant liquid under pressure including metering means therefor, a source of washing liquid under pressure including metering means therefor, valve means for interconnecting said liquid sources to said charging head through said metering means, said valve means including an oscillating valve member having a neutral position and a charging position on each side of the neutral position for respectively charging the propellant and the washing liquid, and mechanism for operating said valve member comprising a rack member operatively connected to rotate said valve member, an operating fluid pressure cylinder having a piston whose piston rod is connected to move said rack in either direction, said piston being disposed at the center of said cylinder when the valve member is at neutral, means for admitting fluid pressure to either side of said piston, a second fluid pressure cylinder whose piston rod is connected to operate said rack in one direction only, said piston rod being moved when said valve member is moved by said operating cylinder to one of said charging positions, and means for admitting fluid pressure to said second cylinder to return said valve to neutral position from said charging position, and a hydraulic snubbing device associated with the piston rod of said operating cylinder, said device being operative to permit prompt but nonviolent movement of said valve member by either said operating cylinder or said second cylinder.

6. A machine for charging a volatile propellant into a pressure-tight container as set forth in claim 5 in which the snubbing device is a hydraulic cylinder disposed coaxially with the operating cylinder and having a piston on the same piston rod with the piston thereof, and an adjustable fluid connection between the cylinder spaces on the opposite sides of said snubbing piston to control the snubbing effect.

7. A machine for charging a volatile propellant into a pressure-tight container as claimed in claim 6 in which the charging head body has a lateral cylindrical chamber adjacent the entrance to the delivery passage, said body also having a radial bore extending from its surface inwardly to said chamber, said bore being larger than said chamber and forming a shoulder at its inner end surrounding said chamber, said bore intersecting the passageway from the discharge port of the annular valve, and a cylindrical loaded back pressure valve supporting member removably positioned in said bore and seated against said shoulder, said member having a longitudinal aperture extending therethrough interconnecting said intersecting passageway and said cylindrical chamber, and a loaded back pressure valve operating at the inner end of said supporting member within said chamber and having a valve stem extending through said aperture.

References Cited in the file of this patent
UNITED STATES PATENTS

| 1,336,071 | Dannelley | Apr. 6, 1920 |
| 2,266,497 | Huntley et al. | Dec. 16, 1941 |
| 2,500,465 | Meyer | Mar. 14, 1950 |
| 2,505,799 | Smith | May 2, 1950 |
| 2,518,064 | Rapisarda | Aug. 8, 1950 |
| 2,542,133 | Gorby | Feb. 20, 1951 |
| 2,613,023 | Reich | Oct. 7, 1952 |
| 2,631,769 | Everett | Mar. 17, 1953 |
| 2,641,399 | McBean | June 9, 1953 |
| 2,663,479 | Detrez | Dec. 22, 1953 |